United States Patent [19]

Meininger et al.

[11] Patent Number: 4,707,545

[45] Date of Patent: Nov. 17, 1987

[54] PROCESS FOR THE PREPARATION OF LITHIUM SALTS OF ANIONIC DYES BY REACTING THE CALCIUM SALTS WITH LITHIUM SULFATE OR LITHIUM HYDROGEN SULFATE

[75] Inventors: Fritz Meininger, Frankfurt am Main; Ludwig Schläfer, Kelkheim, both of Fed. Rep. of Germany

[73] Assignee: Hoechst Aktiengesellschaft, Frankfurt am Main, Fed. Rep. of Germany

[21] Appl. No.: 801,751

[22] Filed: Nov. 26, 1985

[30] Foreign Application Priority Data

Nov. 28, 1984 [DE] Fed. Rep. of Germany ....... 3443305

[51] Int. Cl.$^4$ .................. C09B 43/00; C09B 46/00; C09B 62/00; C09B 62/503

[52] U.S. Cl. ........................ 534/588; 534/583; 534/617; 534/622; 534/626; 534/627; 534/629; 534/632; 534/633; 534/635; 534/636; 534/637; 534/638; 534/642; 534/887; 544/355; 260/371; 260/372

[58] Field of Search ............ 534/583, 887, 642, 638, 534/632, 588; 260/371, 372; 544/355

[56] References Cited

U.S. PATENT DOCUMENTS

| | | | |
|---|---|---|---|
| 2,694,056 | 11/1954 | Ludwig et al. | 534/583 X |
| 2,796,415 | 6/1957 | Ludwig et al. | 534/583 X |
| 3,321,457 | 5/1967 | Kissa | 534/583 X |
| 3,600,376 | 8/1971 | Franklin | 534/583 X |
| 3,621,008 | 11/1971 | Ross et al. | 534/583 X |
| 3,635,944 | 1/1972 | Litke | 534/583 X |
| 3,655,640 | 4/1972 | Hoare | 534/583 X |
| 4,002,603 | 1/1977 | Robbins et al. | 534/583 X |

FOREIGN PATENT DOCUMENTS

| | | | |
|---|---|---|---|
| 0077965 | 5/1983 | European Pat. Off. | 534/683 |
| 0087703 | 9/1983 | European Pat. Off. | 534/683 |
| 1950097 | 4/1970 | Fed. Rep. of Germany | 534/683 |
| 1318111 | 5/1973 | United Kingdom | 534/683 |

OTHER PUBLICATIONS

Sisler et al, "General Chemistry, A Systematic Approach", The Macmillan Company, New York, pp. 214, 215 and 444 (1949).

Primary Examiner—Floyd D. Higel

[57] ABSTRACT

Lithium salts of anionic dyes are prepared by first converting another salt of this anionic dye in aqueous solution or suspension by means of a compound which releases calcium ions into the water-insoluble or sparingly water-soluble calcium salt of the dye, which is separated from the aqueous medium and is then converted to an aqueous suspension by treatment with lithium sulfate or lithium hydrogensulfate or a mixture thereof in an equivalent amount of each or in an excess of up to 10% into its lithium salt.

18 Claims, No Drawings

4,707,545

PROCESS FOR THE PREPARATION OF LITHIUM SALTS OF ANIONIC DYES BY REACTING THE CALCIUM SALTS WITH LITHIUM SULFATE OR LITHIUM HYDROGEN SULFATE

The high solubility of the lithium salts of anionic dyestuffs compared with their customary sodium and potassium salts is known and has been described in several publications. To utilize this increase in solubility, it has previously been variously attempted to convert the sodium and potassium salts of dyes into their lithium salts. This is because the improvement in the solubility of a dye brings with it a number of advantages, for example that no precipitations which would lead to reduced color yields and to unlevel spotty dyeings occur during dyeing or printing. In particular, however, dyes which are highly water-soluble make it possible to prepare highly concentrated and stable aqueous dye solutions which have many application advantages and are commercially desirable. The additional conversion of anionic dyes into their lithium salts is one such way of improving the solubility.

Improving the solubility of an anionic dye by conversion into its lithium salt has the advantage, inter alia, that anionic dyes are conferred further advantageous properties without change in the chromophore. This applies especially to anionic dyes having fiber-reactive groups, such as, in particular, those which carry a $\beta$-sulfatoethylsulfonyl group as a fiber-reactive group alone or in addition to another fibre-reactive group. Dyes of this type can become less water-soluble by addition of alkali and electrolyte salt. Alkaline compounds and electrolyte salts are added for example when such dyes are used in printing and dyeing; if as a result the dye becomes less soluble, this leads to precipitations of the dye in the dyeing liquor or in the print paste with the consequence that weak or even unlevel and spotty dyeings or prints are obtained. However, the improved solubility of the lithium salts of dyes reduces the solubility-reducing action of alkalis and electrolyte salts, so that, for the same concentration of dye, the dyeing and printing results are better.

Other fiber-reactive anionic dyes which possess bulky and hydrophobic fiber-reactive radicals, such as, for example, a monochlorotriazinyl, dichlorotriazinye, monofluorotriazinyl, difluorotriazinyl, dichloropyridazine or benzodichloropyridazine radical or the radical of dichloroquinoxalinecarboxylic acid or the fluorine-, chlorine- or mesyl-substituted radical of pyrimidine, are limited by their radicals in their solubility and hence in their applicability in dyeing and printing. Here too there is an improvement in the solubility and thus in the applicability of these dyes when they are present as lithium salts.

The synthesis of such lithium salts, or rather the conversion of sodium or potassium salts of anionic dyes into the corresponding lithium salts, has therefore been the subject of a number of procedures which are described in the literature but which have disadvantages.

For instance, in U.S. Pat. No. 3,655,640 the dye prepared there is obtained in the form of the sodium salt, which is first converted by neutralization with sulfuric acid into a dye product which is supposed to be present in the acid form of this dye, from which, by reaction with lithium hydroxide, the lithium salt of the dye is then prepared.

This procedure has disadvantages in particular for anionic fiber-reactive dyes which generally contain two or more water-solubilizing groups, such as sulfo groups. If it is now attempted to convert their sodium or potassium salts by means of acid into the acid form of the dye, this is not possible quantitatively; the dye, if it precipitates at all, precipitates in the form of its acid sodium or potassium salt. It is very difficult to use aqueous solutions of an acid such as hydrochloric or sulfuric acid, to wash the residual alkali metal ions out of this complex mixture of dyes, and it cannot be ruled out that this longwinded acid treatment will do damage to the fiber-reactive groups of the dye. Moreover, owing to the large amounts of acid waste waters there are problems in working up. In many cases, however, the precipitation of the dye in the acid form by acidification is not possible at all, since anionic dyes having fiber-reactive groups are, owing to their large number of water-solubilizing groups in the molecule, precipitable and isolatable with acids only in the presence of sodium chloride or potassium chloride, so that their conversion into the lithium salts by means of lithium hydroxide is naturally no longer possible.

In European Patent Application Publication No. 0,087,703A, a similar method is employed for converting the dye sodium salts obtainable from the synthesis into their lithium salts.

A different way of preparing lithium salts of dyes, which is admittedly restricted to those of 1:2-metal-complex azo dyes, is described in European Patent Application Publication No. 0,077,965A; therein these lithium dyes are prepared by carrying out the coupling reaction in an organic water-miscible solvent at a pH which is set during the coupling reaction by means of a lithium compound which has an alkaline reaction in water, the resultant metal complex azo dye predominantly remaining in solution as the lithium salt while inorganic sodium salts, such as sodium chloride, largely precipitate. In addition to the fact that this process is specific to metal complex azo dyes, it has the disadvantage that it is necessary to use water-miscible organic solvents which are expensive to recover.

Furthermore, German Offenlegungsschrift No. 1,950,097 and U.S. Pat. No. 3,635,944 describe the preparation of lithium salts of anionic azo dyes; however, they are obtained not as pure lithium salts but as lithium-sodium salts, since in the synthesis of these dyes it is necessary to use reagents which are present as sodium compounds; for instance, a lithium nitrite required for the diazotization is industrially not accessible, and intermediate isolations by precipitation with lithium chloride are not possible.

The process of British Pat. No. 1,318,111 likewise produces mixtures of lithium and sodium salts of anionic azo dyes, since the conversion of the sodium salts of fiber-reactive dyes into the lithium salts for the purpose of improving the solubility of the dye is merely effected by addition of a water-soluble lithium salt.

The present invention now provides a process which leads to pure lithium salts of anionic dyes having, if desired, fiber-reactive groups and which does not have the disadvantages of the known processes.

This process according to the invention comprises reacting a dyestuff salt which is present in a form other than as lithium salt, such as a salt generally obtainable from the synthesis, such as the sodium and potassium salt or ammonium salt of the dyestuff, in aqueous solution or suspension with a compound which gives off an calcium ion, such as calcium chloride, to convert that dyestuff into the water-insoluble or sparingly water-soluble calcium salt of that dyestuff which is then separated from the aqueous medium and then converted in an aqueous suspension by treatment with lithium sulfate or lithium hydrogensulfate or a mixture thereof in an equivalent amount of each, or in an excess of up to 10%, preferably 5%, into the lithium salt of the dyestuff.

A variant according to the invention of this process comprises starting directly from the calcium salt of the anionic dye obtained from the synthesis of the dye, for example in the case of azo dyes by coupling the calcium salt of a coupling component with the diazonium salt of a diazo component using alkaline calcium compounds, such as calcium carbonate or calcium hydroxide, for setting the required pH range in the otherwise conventionally executed coupling reaction, and reacting this calcium salt of the dye in the abovementioned manner according to the invention with lithium sulfate and/or lithium hydrogen sulfate.

The calcium sulfate which precipitates as a water-insoluble compound in the reaction of the dye calcium salt with the lithium sulfate or lithium hydrogensulfate is subsequently filtered off, leaving a filtrate which contains, in solution, the lithium salt of the dye in practically pure form. Calcium sulfate or calcium ions still present dissolved in an extremely small amount in the filtrate can be removed completely by means of a small amount of lithium oxalate. The filtrate obtainable after calcium oxalate has been separated off is then practically free of sodium, potassium and calcium salts and ions. The pure lithium salt of the dye can be isolated from this solution in solid form by evaporating to dryness or spray-drying.

Preferably, however, it is the filtrate of the pure dye lithium salt itself which, if desired after prior concentration by removal of water (for example by distillative removal under reduced pressure) and if desired after addition of buffer substances, preferably containing lithium ions, for setting a pH between 3 and 7, is used in dyeing. Such concentrated aqueous dye solutions have, as is known, the advantage of being easier to use, since they are more easily metered and, by their very nature, unlike dye powders, are non-dusting.

The process according to the invention is carried out, for example, by mixing, preferably adding, at a temperature between 15° and 80° C., an aqueous calcium chloride solution of very high concentration such as above 10% by weight, or calcium chloride itself with, respectively to, an aqueous solution of the sodium or potassium salt of the anionic dye, advantageously to the solution of this dye salt which is obtainable from the synthesis. The batch is afterwards stirred for some more time, for example for about 20 to 60 minutes, during which it can be allowed to cool down to room temperature; if necessary, the suspension of the resultant calcium salt of the dye can be cooled down further to 10° C. The precipitated product is separated off, for example by filtration, and the moist residue is washed with aqueous calcium chloride solution to free it essentially of alkali metal ions. The moist calcium salt of the dye is then slurried or suspended in water; advantageously the amount of water can be low herein as long as the slurry or suspension is still sufficiently stirrable. Lithium sulfate and/or lithium hydrogensulfate is then added in an amount equivalent to the calcium ions of the dye, and stirring is continued for some time; for this purpose room temperature such as 10° to 30 ° C. is sufficient; however, it is also possible to use temperatures of up to 50° C. The precipitated calcium sulfate is then separated off, for example by filtration, and if desired for complete removal of calcium ions the filtrate can be treated with a small amount of lithium oxalate, in solid form or very concentrated solution.

The precipitated calcium oxalate is filtered off with suction, now leaving a filtrate which contains the lithium salt of the dye in pure form and practically without further admixtures, such as inert electrolyte salts. By concentration it is generally possible to obtain more concentrated dye solutions of the lithium salt which, preferably at a pH between 4 and 5, if necessary containing a buffer for setting this pH range, are highly stable even to storage for several weeks and at a temperature up to 50° C., thus showing no precipitations in the dye product and producing even after prolonged storage undiminishedly strong or practically undiminishedly deep and level dyeings or prints on the fiber materials suitable for these dyes.

Using the process according to the invention it is thus possible to prepare advantageous concentrated and stable dye solutions of the lithium salts of such dyes, which are commercially and easily usable in dyehouses and printing works.

The process according to the invention for converting dye salts of anionic dyes into their lithium salts can be carried out on any water-soluble anionic dye having one, two or more sulfo and/or carboxy groups, preferably sulfo groups, in particular including those dyes which contain at the same time a fiber-reactive radical of the vinylsulfonyl series, such as a radical of the general formula (2a) mentioned and defined hereinafter, or another fiber-reactive radical, such as, in particular, from the heterocyclic series, for example one of the fiber-reactive radicals mentioned at the beginning, or for example one of these, in particular heterocyclic, radicals and a radical of the vinylsulfone series, such as the β-sulfatoethylsulfonyl radical.

Such anionic dyes are extensively described in the literature, or they are analogous to the dyes described.

Such dyes are predominantly sulfo-containing metal-free azo dyes, metal-complex azo dyes, dioxazine, formazane, phthalocyanine and anthraquinone dyes, preferably those having one or two fiber-reactive groups, for example dyes conforming to a general formula (1)

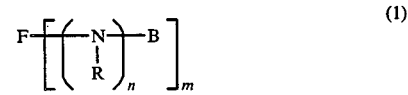

in which

F denotes the radical of a water-soluble dye having 1 to 8 sulfo groups, from the series of the metal-free monoazo and disazo dyes, of the metal complex, such as 1:1-copper, 1:2-chromium and 1:2-cobalt complex, monoazo and disazo dyes, of the dioxazine, formazane, phthalocyanine and anthraquinone series, R is a hydrogen atom or an alkyl group of 1 to 4 carbon atoms, such as an ethyl or methyl group, n stands for the number zero or one and m stands for the number one or two, and B is a radical of the general formula (2a), (2b), (2c), (2d), (2e), (2f), (2g), (2h), (2j) or (2k)

$$-SO_2-Z \qquad (2a)$$

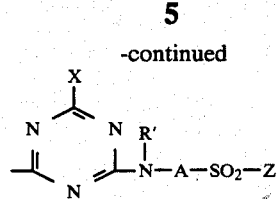
(2b)

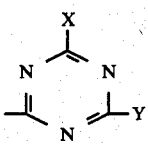
(2c)

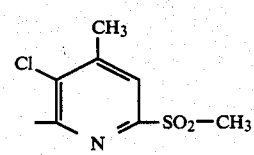
(2d)

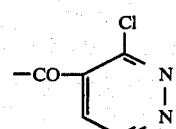
(2e)

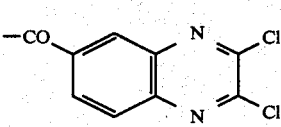
(2f)

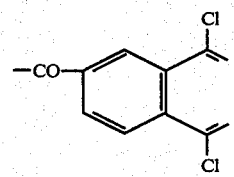
(2g)

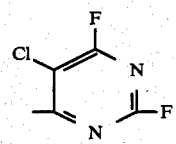
(2h)

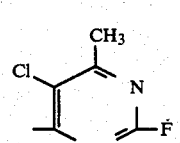
(2j)

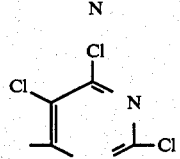
(2k)

in which

Z is a β-sulfatoethylsulfonyl, β-chloroethylsulfonyl, β-thiosulfatoethylsulfonyl, β-acetyloxyethylsulfonyl or vinylsulfonyl group, of these preferably a β-sulfatoethylsulfonyl group, X denotes a chlorine or fluorine atom, R' is a hydrogen atom or an alkyl group of 1 to 4 carbon atoms, such as an ethyl or methyl group, or a group of the general formula (3)

—alkylene—SO$_2$—Z    (3)

in which

"alkylene" denotes an alkylene group of 1 to 6 carbon atoms, preferably 2 to 4 carbon atoms, such as, for example, a 1,2-ethylene or 1,3-propylene group, and Z has one of the abovementioned meanings, A denotes an alkylene group of 1 to 6 carbon atoms, preferably 2 to 4 carbon atoms, such as, for example, a 1,2-ethylene or 1,3-propylene group, or is a phenylene group which can be substituted by 1 or 2 substituents from the group consisting of sulfo, carboxy, chlorine, methyl, ethyl, methoxy and ethoxy, or is a naphthylene group which can be substituted by 1 or 2 sulfo groups, and Y denotes an alkoxy group of the general formula —O—R$^1$ or an amino group of the general formula —NR$^2$R$^3$ in which R$^1$ is an alkyl group of 1 to 4 carbon atoms, such as a methyl or ethyl group, R$^2$ is a hydrogen atom or an alkyl group of 1 to 4 carbon atoms, such as, in particular, a methyl or ethyl group, which can be substituted by an hydroxy, sulfato, sulfo, carboxy or cyano group, for example is a β-hydroxyethyl, β-sulfatoethyl or β-sulfoethyl group, and R$^3$ is a hydrogen atom or an alkyl group of 1 to 4 carbon atoms, such as a methyl or ethyl group, which can be substituted by an hydroxy, sulfato, sulfo, carboxy, cyano, phenyl or sulfophenyl group, such is, for example, a β-hydroxyethyl, β-sulfatoethyl, β-sulfoethyl, benzyl, phenethyl or 4-sulfobenzyl group, or represents a phenyl radical which can be substituted by 1 or 2 substituents from the group consisting of sulfo, carboxy, chlorine, methyl, ethyl, methoxy and ethoxy, such as, in particular, is a 3-sulfophenyl group.

Dyes of the general formula (1) are in particular those azo and metal complex azo dyes (for instance metal-free phenyl-azo-naphthol, naphthyl-azo-naphthol, phenyl-azo-pyrazolone and naphthyl-azo-pyrazolone dyes and their 1:1-copper complexes, as well as metal-free phenyl-azo-acetoacetylarylide, naphthyl-azo-acetoacetylarylide, phenyl-azo-pyridone, naphthyl-azo-pyridone, phenyl-azo-naphthylamine and naphthyl-azo-napthylamine dyes, and also for example metal-free phenyl- or naphthyl-azo-phenyl-azo-naphthol and phenyl- or naphthyl-azo-naphthol-azo-naphthol dyes and their 1:1-copper complex dyes), dioxazine, such as, in particular, triphendioxazine, formazane, such as, in particular, copper-formazane, phthalocyanine, such as, in particular, copper- and nickel-phthalocyanine, and anthraquinone dyes which contain one or two fiber-reactive groups selected from the groups of the general formulae (4a), (4b), (4c), (4d), (4e), (4f), (4g), (4h), (4j), (4k), (4m) and (4n).

—SO$_2$—Z    (4a)

—N—SO$_2$—Z    (4b)
|
Alk

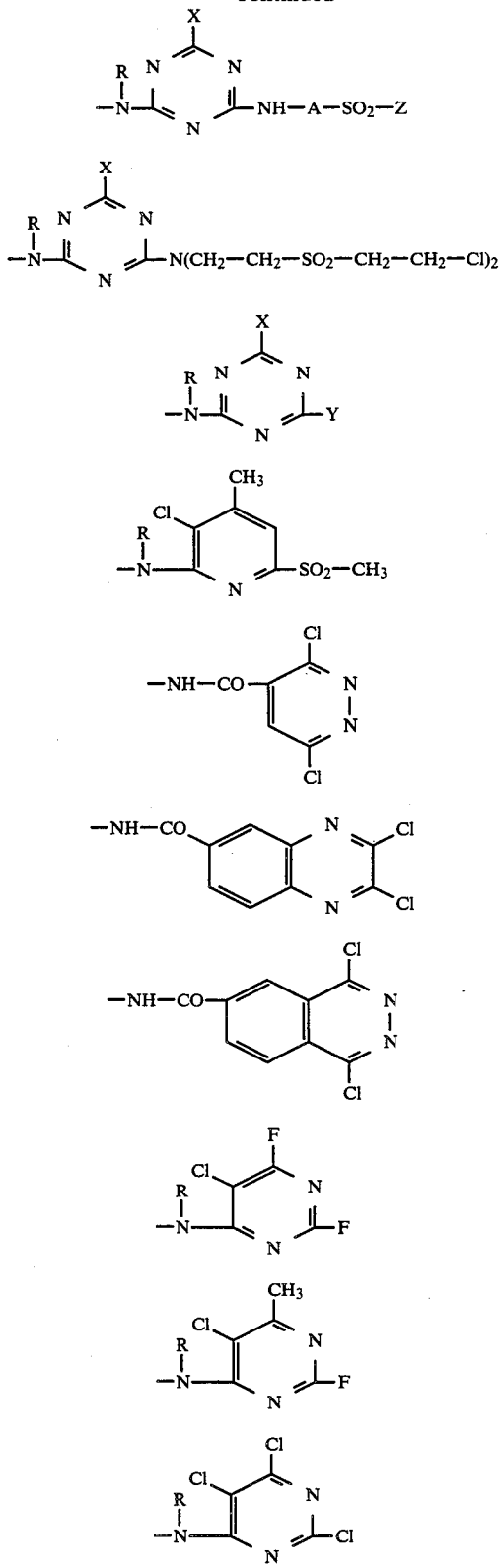

in which
Z, R, X, A and Y have the abovementioned meanings,
Alk denotes an alkyl group of 1 to 4 carbon atoms, such as a methyl group, and A preferably denotes a phenylene radical which can be substituted by one or two substituents selected from the group comprising 1 sulfo, 1 carboxy, 1 chlorine, 1 methyl, 2 methoxy and 2 ethoxy, but which is preferably not substituted.

Of the dyes which can be used according to the invention, the following may be mentioned purely illustratively:

the azo dye from 2,5-dimethoxy-4-(β-sulfatoethylsulfonyl)aniline as the diazo component and 1-(4-sulfophenyl)-3-methyl-5-pyrazolone as the coupling component;

the azo dye from 2-methoxy-5-methyl-4-(β-sulfatoethylsulfonyl)-aniline as the diazo component and acetoacetyl-(2-methoxy-5-methyl-4-sulfo)-anilide as the coupling component;

the azo dye from 3'- β-sulfatoethylsulfonyl-4-aminobenzene-carbanilide as the diazo component and 1-(4-sulfophenyl)-3-carboxy-5-pyrazolone as the coupling component;

the azo dye from 3-(β-sulfatoethylsulfonyl)-aniline as the diazo component and 2-acetylamino-6-sulfo-8-naphthol as the coupling component;

the azo dye from 4-(β-sulfatoethylsulfonyl)-aniline as the diazo component and 2-acetylamino-6-sulfo-8-naphthol as the coupling component;

the azo dye from 4-(β-sulfatoethylsulfonyl)-aniline as the diazo component and 3-acetylamino-6-sulfo-8-naphthol as the coupling component;

the azo dye from 2,5-dimethoxy-4-(β-sulfatoethylsulfonyl)-aniline as the diazo component and 1-(4'-sulfophenyl)-3-carboxy-5-pyrazolone as the coupling component;

the azo dye from 2-amino-1,5-disulfonaphthalene as the diazo component and 3-[N-methyl-N-(2'-chloro-4'-amino-s-triazin-6'-yl)]-amino-6-sulfo-8-naphthol as the coupling component;

the azo dye from 3'-β-sulfatoethylsulfonyl-4-aminobenzenecarbanilide as the diazo component and 1-acetylamino-3,6-disulfo-8-naphthol as the coupling component;

the azo dye from 2-methoxy-5-(β-sulfatoethylsulfonyl)-aniline as the diazo component and 5-sulfo-1-naphthol as the coupling component;

the azo dye from 2-methoxy-5-(β-sulfatoethylsulfonyl)-aniline as the diazo component and 1-acetylamino-3,6-disulfo-8-naphthol as the coupling component;

the azo dye from 2-amino-1-sulfo-6-(β-sulfatoethylsulfonyl)-naphthalene as the diazo component and 1-benzoylamino-3,6-disulfo-8-naphthol as the coupling component;

the anthraquinone dye 1-amino-2-sulfo-4-[3'-(β-sulfatoethylsulfonyl)-phenyl]-amino-anthraquinone;

the anthraquinone dye 1-amino-2-sulfo-4-[2'-carboxy-5'-(β-sulfatoethylsulfonyl)-phenyl]-aminoanthraquinone;

the azo dye from 4-amino-2-sulfodiphenylamine as the diazo component and 1-(2',4'-dichloro-s-triazin-6'-yl)-amino-3,6-disulfo-8-naphthol as the coupling component;

the copper complex azo dye of the o,o'-dihydroxyazo compound with 4-sulfo-2-aminophenol as the diazo component and 1-(4'-β-sulfatoethylsulfonylphenyl)-3-methyl-5-pyrazolone as the coupling component;

the azo dye of Example 14 of German Pat. No. 1,644,157;

the azo dye of Example 2 of German Pat. No. 1,112,225;

the azo dye from the 6th tabulated example in columns 7/8 of German Pat. No. 1,943,904;

the azo dye of Example 1 of German Auslegeschrift No. 1,019,025;

the azo dye of Example 3 of German Pat. No. 1,135,592;

the azo dye of tabulated Example 31 of German Pat. No. 1,204,762;

the azo dye of Example 3 of German Pat. No. 1,644,240;

the azo dye of Example 1 of European Patent Application Publication No. 0,032,187A;

the copper complex azo dye of Example 45 of German Pat. No. 1,126,542;

the azo dye of tabulated Example 3 in column 7 of German Pat. No. 2,142,728;

the azo dye of Example 1 of German Auslegeschrift No. 1,062,367;

the copper formazan dye of Example 1 of German Offenlegungsschrift No. 2,945,537;

the copper complex disazo dye of tabulated Example 1 in columns 15/16 of German Pat. No. 1,544,541;

the anthraquinone dye of Example 3 of German Pat. No. 1,117,245;

the anthraquinone dyes of Examples 1 and 2 of German Pat. No. 1,090,630;

the copper complex azo dye of Example 23 of German Ausegeschrift No. 1,089,098;

the copper complex azo dyes of Example 11 of Swiss Auslegeschrift No. 1472/75;

the azo dye of Example IV of European Patent Application Publication No. 0,092,119A;

the anthraquinone dye of Example 1 of German Ofenlegungsschrift No. 2,942,364;

the copper phthalocyanine dye of Example 12 of German Auslegeschrift No. 1,152,493;

the azo dye of the 9th tabulated example on page 30 of German Offenlegungsschrift No. 2,208,972;

the azo dye of Example 5 of German Auslegeschrift No. 1,101,657;

the azo dye of Example 1 of German Auslegeschrift No. 1,113,050;

the azo dye of Example 80 of German Offenlegungsschrift No. 1,644,204;

the azo dye of Example 394 of German Offenlegungsschrift No. 1,644,204;

the disazo dye of Example 49 of German Offenlegungsschrift No. 2,001,960;

the disazo dye of tabulated Example 57 of German Offenlegungsschrift No. 2,001,960;

the disazo dye of Example 1 of Swiss Pat. No. 599,316;

the azo dye of tabulated Example 15 of German Auslegeschrift No. 1,191,059;

the azo dye of Example 1 of German Pat. No. 1,952,261;

the azo dye of Example 3 of German Offenlegungsschrift No. 2,232,541;

the disazo dye of Example 2 of German Offenlegungsschrift No. 2,733,109;

the disazo dye of Example 11 of European Patent Application Publication No. 0,042,108A;

the disazo dye of Example 1 of German Pat. No. 2,748,965;

the dye bearing the Colour Index name C.I. Reactive Red 8 (C.I. No. 17908);

the dye C.I. Reactive Brown 1 (C.I. No. 26440).

The examples below serve to illustrate the invention. The parts and percentages are by weight, unless otherwise stated. Parts by weight relate to parts by volume as the kilogram relates to the liter.

EXAMPLE 1

600 parts by volume of an aqueous solution which contains 69 parts of the dye of the formula

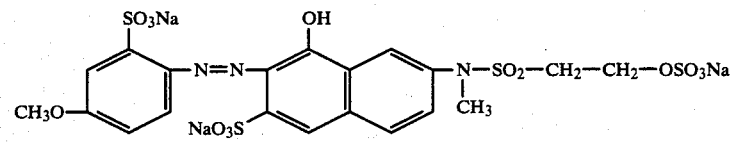

known from tabulated Example 31 of German Pat. No. 1,204,762 (the aqueous solution used can be a solution obtained from the synthesis of the dye) has added to it 75 parts of calcium chloride and is cooled down to 15° C. The precipitated calcium salt of this dye is filtered off with suction and is washed with 100 parts by volume of 25% strength aqueous calcium chloride solution and is sucked until thoroughly dry. This moist product (170 parts) is suspended in 100 parts of water; 22 parts of lithium sulfate are added, the precipitated calcium sulfate is filtered off, the filtrate has added to it lithium oxalate in an amount of 0.3 part per 100 parts by volume of filtrate, the precipitated calcium oxalate is filtered off with suction, and the filtrate containing the dissolved lithium salt of the abovementioned dye is set to 160 parts by evaporating or by diluting with water. The amount of lithium salt of this dye present in the solution is about 30%.

The resultant solution of the lithium dye is at a pH of 4-5 and at temperatures of up to 50° C. storable for several weeks. When the solution is used in technologically conventional printing and pad-dyeing methods for fiber-reactive dyes, strong level red prints and pad-dyeings having good wet fastness properties are obtained.

The lithium dye can also be obtained in solid form as an electrolyte-containing dye powder by evaporating or spray-drying the dye solution in conventional manner.

EXAMPLE 2

150 parts of calcium chloride are added to 1000 parts by volume of a solution containing about 120 parts of the dye of the formula

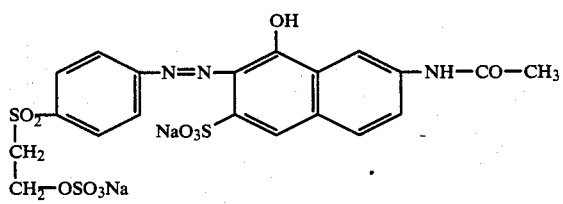

(for example a solution of this dye directly obtainable from the synthesis), and the mixture is stirred at pH 5 to 7 for some time. The precipitated calcium salt of this dye is filtered off with suction at 20° C. and is washed with 350 parts by volume of 15% strength aqueous calcium chloride solution. The moist filter cake (about 220 parts) contains about 0.1% sodium ions and 4% calcium ions; it is stirred for some time with 380 parts of an aqueous solution of 24.2 parts of lithium sulfate (i.e. the amount of lithium salt which is equivalent to the amount of calcium in the moist filter cake), the precipitated calcium sulfate is filtered off, and residual calcium ions in the filtrate are removed by precipitation with lithium oxalate.

This gives about 600 parts of a dye solution containing about 17% of the lithium salt of the abovementioned dye. This dye solution has a high storability and is very highly suitable for use in technologically customary printing methods and pad-dyeing methods for fiber-reactive dyes. Strong level orange dyeings are obtained even after storage at temperatures of up to 50° C. for several weeks. The lithium dye can also be obtained in so form as an electrolyte-containing dye powder by evaporating or spray-drying the dye solution in conventional manner.

EXAMPLE 3

The dye of the formula

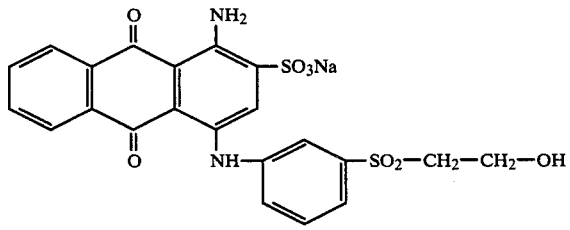

is esterified with sulfuric acid monohydrate to give the corresponding β-sulfatoethylsulfonyl compound by adding 50.2 parts of this dye at a temperature between 20° and 50° C. to 240 parts of sulfuric acid monohydrate and stirring the reaction mixture until a clear solution is obtained, which is then poured onto 900 parts of a mixture of ice and water. The acid solution is neutralized with about 270 parts of calcium carbonate, the precipitated calcium carbonate is filtered off, and the filtrate containing the calcium salt of this β-sulfatoethylsulfonyl dye in solution has added to it 12 parts of lithium sulfate. Stirring is continued for some time, and the precipitated calcium sulfate is filtered off with suction. Residual calcium ions are precipitated from this filtrate with lithium oxalate.

The filtrate is a storable aqueous solution of the lithium salt of this β-sulfatoethylsulfonyl-anthraquinone dye. A solution of this lithium dye containing up to 20 parts of the dye in 100 parts by volume of the solution has an unchanged high storability.

The lithium dye can also be obtained in solid form as an electrolyte-containing dye powder by evaporating or spray-drying the dye solution in conventional manner.

EXAMPLE 4

80 parts of the dye of the formula

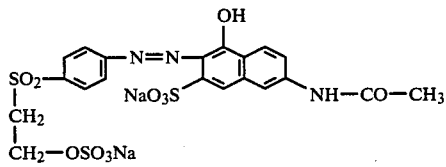

are dissolved at 60° C. in 1000 parts of water, and 150 parts of calcium chloride are added. Stirring is continued until the batch is cooled down to 20° C., and the precipitated calcium salt of the dye is filtered off with suction and is washed with about 300 parts by volume of 10% strength aqueous calcium chloride solution. This gives about 200 parts of a moist filter cake which contains about 0.2% sodium ions and 4 to 5% calcium ions. The cake is stirred into a solution of 30 parts of lithium sulfate in 300 parts of water. The precipitated calcium sulfate is then filtered off, the filtrate is freed from calcium ions with lithium oxalate, and the precipitated calcium oxalate is filtered off.

This gives about 500 parts of an aqueous solution containing about 70 parts of the lithium salt of this dye, having a high storability even after several weeks of storage at temperatures up to 50° C., and then still producing strong orange, level and fast prints and dyeings by methods customary for fiber-reactive dyes.

The lithium dye can also be obtained in solid form as an electrolyte-containing dye powder by evaporating or spray-drying the dye solution in conventional manner.

EXAMPLE 5

A solution of 128 parts of the dye of the formula

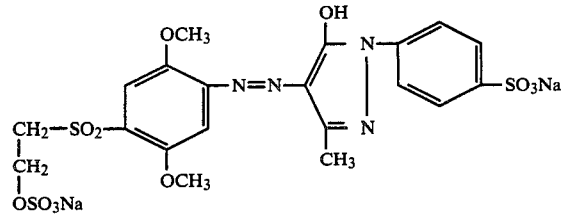

(which can be prepared in conventional manner by coupling diazotized 2,5-dimethoxy-4-(β-sulfatoethylsulfonyl)-aniline onto 1-(4-sulfophenyl)-3-methyl-5-pyrazolone) in 1000 parts of water has added to it 150 parts of calcium chloride, and the mixture is stirred for some time. The precipitated calcium salt of the dye is filtered off with suction and is washed with 350 parts by volume of 15% strength aqueous calcium chloride solution. This gives about 250 parts of a moist filter residue containing at most 0.3% sodium ions and 5% calcium ions. This filter residue is suspended in 350 parts of water, and 35 parts of lithium sulfate are added. The suspension is stirred for some time, the precipitated calcium sulfate is filtered off, the filtrate has added to it 2 parts of lithium oxalate, and the precipitated calcium oxalate is separated off.

This gives about 600 parts of aqueous dye solution of the lithium salt of the abovementioned dye, which is highly stable even to prolonged storage at temperatures of up to 50° C. and afterwards produces strong and level dyeings on cellulose fiber materials when applied in conventional dyeing, padding and printing methods for fiber-reactive dyes.

The lithium dye can also be obtained in solid form as an electrolyte-containing dye powder by evaporating or spray-drying the dye solution in conventional manner.

EXAMPLE 6

1000 parts by volume of an aqueous solution of 158 parts of the dye of the formula

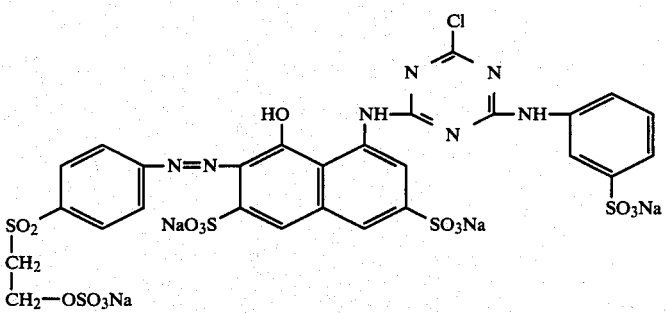

known from Example 1 of European Patent Application Publication No. 0,032,187A have added to them 200 parts of calcium chloride, and the mixture is stirred for some time. The precipitated calcium salt of the dye is filtered off with suction and is freed from residual sodium ions by washing with 500 parts by volume of 20% strength aqueous calcium chloride solution. The resulting approximately 320 parts of the moist filter cake containing about 5% calcium ions are suspended with thorough stirring in a solution of 44 parts of lithium sulfate in 300 parts of water. The precipitated calcium sulfate is then filtered off with suction and is washed with water until colorless. The filtrate has added to it 3 parts of lithium oxalate, and precipitated calcium oxalate is filtered off and washed.

The filtrate can be concentrated by partial evaporation to give an aqueous solution which contains the lithium salt of this dye in an amount of 30%, and which is highly stable even after several weeks at temperatures of up to 50° C., so that using the dyeing methods customary in the art for fiber-reactive dyes the level dyeings obtained are practically as strong as before.

EXAMPLE 7

A solution of 65 parts of the dye of the formula

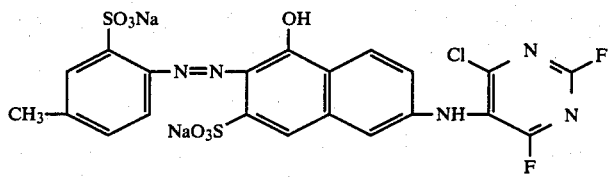

known from Example IV of European Patent Application Publication No. 0,092,119A in 450 parts of water has added to it 75 parts of calcium chloride, and the mixture is stirred for 2 hours. The precipitated calcium salt of this dye is filtered off with suction and is washed with 200 parts by volume of 50% strength aqueous calcium chloride solution. This gives about 140 parts of a moist filter cake having a sodium ion content of below 0.1% and a calcium ion content of 5.2%, which is stirred into 500 parts of 4% aqueous lithium sulfate solution. The suspension is stirred for some time, and precipitated calcium sulfate is removed by filtration.

This gives 550 parts of an aqueous solution which contains the lithium salt of the abovementioned dye and which is highly storable and produces strong and level dyeings even after weeks of storage.

The lithium dye can also be obtained in solid form as an electrolyte-containing dye powder by evaporating or spray-drying the dye solution in conventional manner.

EXAMPLE 8

100 parts of calcium chloride are stirred into a solution of 73 parts of the dye of the formula

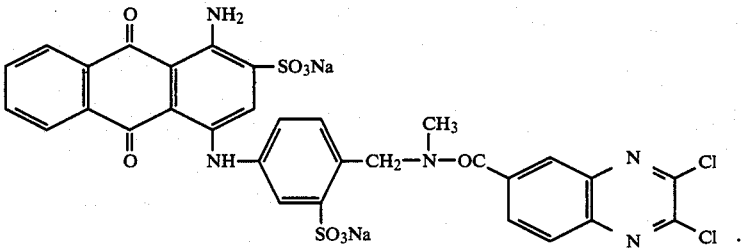

known from Example 1 of German Offenlegungsschrift No. 2,942,364 in 900 parts of water, the mixture is stirred for some time, and the precipitated calcium salt of this dye is filtered off with suction and is washed with 10% strength aqueous calcium chloride solution. The resulting approximately 185 parts of the moist filter cake having a calcium content of 4.3% are stirred into 730 parts of 3% strength aqueous lithium sulfate solution, the suspension is stirred for some time, precipitated calcium sulfate is filtered off, and the filtrate is freed from residual calcium ions by means of lithium oxalate.

This gives approximately 750 parts of an aqueous solution of the lithium salt of the abovementioned dye, which even after prolonged storage produces strong and level dyeings on cellulose fiber materials using the dyeing methods customary in the art for fiber-reactive dyes.

EXAMPLE 9

24 parts of 2-amino-8-naphthol-6-sulfonic acid are dissolved in 50 parts of water by means of 6 parts of calcium carbonate. At 20° to 60° C., 13 parts by volume of acetic anhydride are added, and the reaction mixture is neutralized with 7 parts of calcium hydroxide, is stirred for 2 hours after heating to 70° to 80° C. and is then allowed to cool down to room temperature.

Separately, a neutral solution of 28.1 parts of 4-($\beta$-sulfatoethylsulfonlyl)-aniline in 70 parts of water is prepared by means of 6 parts of calcium carbonate, 70 parts of ice are added and at a temperature of 0° to 10° C. diazotization is carried out in the course of around 2 hours by gradual addition of 18 parts by volume of 40% strength aqueous nitrosylsulfuric acid solution. After the diazotization reaction, excess nitrosylsulfuric acid is destroyed with sulfamic acid.

The diazonium salt suspension thus obtained has added to it the abovementioned batch containing the calcium salt of 2-acetylamino-8-naphthol-6-sulfonic acid as the coupling component, this coupling batch is brought to pH 5 to 5.5 by means of 26 parts of calcium carbonate, and stirring is continued until the coupling has ended.

The precipitated calcium salt of the resulting azo dye is filtered off with suction. This gives about 170 parts of a moist filter cake which, in addition to the dye mentioned, also contains calcium sulfate; the filter cake is stirred into a warm aqueous solution at 70° C. having a pH of 4 to 5, of 11 parts of lithium sulfate in 100 parts of water. Stirring is continued for a brief time, and the calcium sulfate is filtered off with suction. The filtrate (about 220 parts by volume) contains the lithium salt of the azo dye described in Example 2; by addition of 0.7 part of oxalic acid and 0.7 part of lithium carbonate this aqueous solution of the lithium dye is freed from residual calcium ions.

Removal of the calcium oxalate by filtration leaves 270 parts by volume of an aqueous storable solution which is free of calcium and sodium ions and contains 53 parts of the dye of the formula

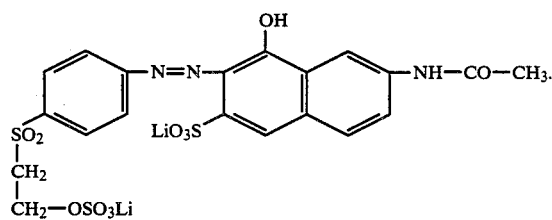

EXAMPLES 10 TO 27

The tabulated examples below describe further lithium salts of dyes which are obtained in a manner according to the invention, for example analogously to one of the above illustrative embodiments - in the form of an aqueous solution or as salt in the solid form - by converting the sodium or potassium salts of the corresponding dye (it being advantageously possible for the solutions of these sodium or potassium salts to be the solutions obtainable in the synthesis of the dye) first of all into their calcium salt and then by replacing the calcium ions of this dye by lithium ions. The resulting solutions of the lithium salts of these dyes likewise have high storability and even after storage for several weeks produce strong and level dyeings. By evaporating or spray-drying the dye solutions it is possible to obtain the lithium salts of the dyes in solid form.

| Example | Lithium salt of the dye described as sodium or potassium salt in ... |
|---|---|
| 10 | German Auslegeschrift 1,152,493, Example 12 |
| 11 | German Offenlegungsschrift 2,208,972, tabulated example on page 30 |
| 12 | German Patent 1,644,157, Example 14 |
| 13 | German Auslegeschrift 1,101,657, Example 5 |
| 14 | German Auslegeschrift 1,113,050, Example 1 |
| 15 | German Offenlegungsschrift 1,644,204, Example 80 |
| 16 | German Offenlegungsschrift 1,644,204, Example 394 |
| 17 | German Offenlegungsschrift 2,001,960, Example 49 |
| 18 | German Offenlegungsschrift 2,001,960, Tabulated Example 57 |
| 19 | Swiss Patent No. 599,316, Example 1 |
| 20 | German Auslegeschrift 1,090,630, Example 1 |
| 21 | German Auslegeschrift 1,191,059, Tabulated Example 15 |
| 22 | German Patent 1,952,261, Example 1 |
| 23 | German Offenlegungsschrift 2,232,541, Example 3 |
| 24 | German Offenlegungsschrift 2,733,190, Example 2 |
| 25 | European Patent Application Publication 0,042,108A, Example 11 |
| 26 | German Patent 1,943,904, Example 6 of the table in columns 7/8 |
| 27 | German Patent 2,748,965, Example 1 |

What is claimed is:

1. A process for preparing a lithium salt of an anionic dye, which comprises reacting a salt of this anionic dye present as a salt other than as the lithium salt, in aqueous solution or suspension with a compound which releases a calcium ion to form the water-insoluble or sparingly water-soluble calcium salt of that dye which is then separated from the aqueous medium and is then reacted in aqueous suspension with the equivalent amount of lithium sulfate or lithium hydrogensulfate or a mixture thereof, or in an excess of up to 10%, to convert it into its lithium salt.

2. The process according to claim 1, wherein the process starts from the sodium or potassium salt of the dye.

3. The process according to claim 1, wherein the dye contains a fiber-reactive group which is reactive with cellulosic fibers.

4. The process according to claim 1, wherein the dye contains a group of the formula

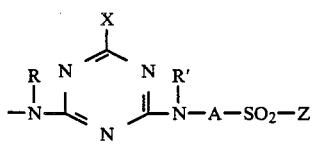

in which X is chlorine or fluorine, R is hydrogen or alkyl of 1 to 4 carbon atoms, Z is $\beta$-sulfatoethylsulfonyl, $\beta$-chloroethylsulfonyl, $\beta$-thiosulfatoethylsulfonyl, $\beta$- acetyloxyethylsulfonyl or vinylsulfonyl, R' is hydrogen or alkyl of 1 to 4 carbon atoms or a group of the formula —alkylene—SO₂—Z in which "alkylene" is an alkylene of 1 to 6 carbon atoms and Z has one of the abovementioned meanings, A is an alkylene of 1 to 6 carbon atoms or is phenylene unsubstituted or substituted by 1 or 2 substituents selected from the group consisting of sulfo, carboxy, chlorine, methyl, ethyl, methoxy and ethoxy, or is a naphthylene unsubstituted or substituted by 1 or 2 sulfo groups.

5. The process according to claim 1, wherein the dye contains a group of the formula

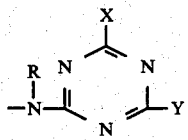

in which X is chlorine or fluorine and Y is a group of the formula —O—R¹ or —NR²R³ in which R¹ is alkyl of 1 to 4 carbon atoms, R² is hydrogen or alkyl of 1 to 4 carbon atoms unsubstituted or substituted by hydroxy, sulfato, sulfo, carboxy or cyano, and R³ is hydrogen or alkyl unsubstituted or substituted by hydroxy, sulfato, sulfo, carboxy, cyano, phenyl or sulfophenyl, or is phenyl unsubstituted or substituted by 1 or 2 substituents selected from the group consisting of sulfo, carboxy, chlorine, methyl, ethyl, methoxy and ethoxy, and R is hydrogen or alkyl of 1 to 4 carbon atoms.

6. The process according to claim 1, wherein the dye contains a group of the formula

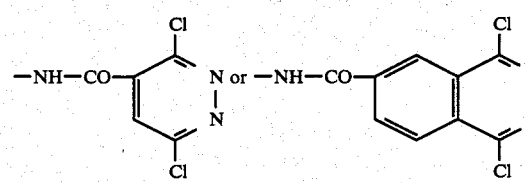

7. The process according to claim 1, wherein the dye contains a group of the formula

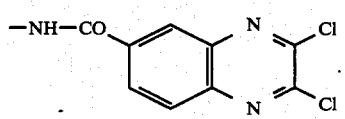

8. The process according to claim 1, wherein the dye contains one or two fiber-reactive groups which are selected from the groups of the formulae (4k), (4m) and (4n)

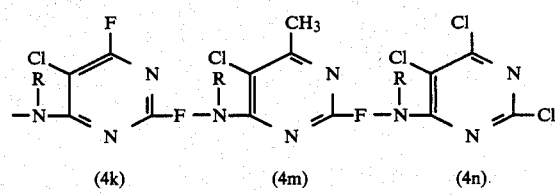

in which R is hydrogen or alkyl of 1 to 4 carbon atoms.

9. The process according to claim 1, wherein the starting dyestuff salt used is the calcium salt of that anionic dyestuff directly obtainable from a synthesis, and this calcium salt is reacted with lithium sulfate or lithium hydrogensulfate or a mixture thereof in an equivalent amount or in an excess of up to 10%.

10. The process according to claim 1, wherein an aqueous solution of the sodium or potassium salt of the anionic dye and an aqueous calcium chloride solution or calcium chloride itself are mixed with one another at a temperature between 15° and 80° C., the suspension of the resulting calcium salt of the dyestuff is cooled down, the precipitated product is separated off, the separated product is washed with an aqueous calcium chloride solution and is then slurried or suspended in water and reacted with the equivalent amount of lithium sulfate or lithium hydrogenuslfate or a mixture thereof or in said excess at a temperature between 10° and 50° C., preferably between 10 ° and 30° C., and the precipitated calcium sulfate is separated from the aqueous solution of the lithiium salt of the anionic dyestuff having been formed.

11. The process according to claim 1, wherein the dye contains one or two fiber-reactive groups selected from β-sulfatoethylsulfonyl, β-chloroethylsulfonyl, β-thiosulfatoethylsulfonyl, β-acetyloxyethylsulfonyl and vinylsulfonyl.

12. The process according to claim 1, wherein the dye contains one or two groups of the formula

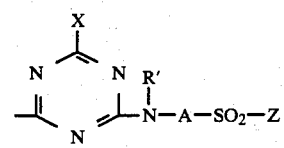 (2b)

or

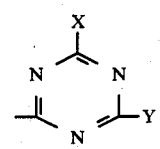 (2c)

in which

Z is β-sulfatoethylsulfonyl, β-chloroethylsulfonyl, β-thiosulfatoethylsulfonyl, β-acetyloxyethylsulfonyl or vinylsulfonyl;

X denotes chlorine or fluorine,

R' is hydrogen or alkyl of 1 to 4 carbon atoms or a group of the formula -alkylene-SO₂-Z, in which "alkylene" denotes alkylene of 1 to 6 carbon atoms, and Z has one of the above mentioned meanings;

A denotes alkylene of 1 to 6 carbon atoms, or is phenylene which is unsubstituted or is substituted by 1 or 2 substituents from the group consisting of sulfo, carboxy, chlorine, methyl, ethyl, methoxy and ethoxy; or is naphthylene which is unsubstituted or is substituted by 1 or 2 sulfo, and Y denotes alkoxy of the formula —O—R¹ or amino of the formula —NR²R³ in which R¹ is alkyl of 1 to 4 carbon atoms;

R² is hydrogen or alkyl of 1 to 4 carbon atoms which is unsubstituted or is substituted by hydroxy, sulfato, sulfo, carboxy or cyano; and R³ is hydrogen or alkyl of 1 to 4 carbon atoms, which is unsubstituted or is substituted by hydroxy, sulfato, sulfo, carboxy, cyano, phenyl or sulfophenyl, or $R^3$ is phenyl which is unsubstituted or is substituted by 1 or 2 substituents from the group consisting of sulfo, carboxy, chlorine, methyl, ethyl, methoxy and ethoxy.

13. The process according to claim 12, wherein the dye contains one said group (2b) or (2c) as a first fiber-reactive group, and the dye contains, bonded elsewhere in the dye molecule, a second fiber-reactive group selected from β-sulfatoethylsulfonyl, β-chloroethylsulfonyl, β-thiosulfatoethylsulfonyl, β-acetyloxyethylsulfonyl and vinylsulfonyl.

14. The process according to claim 1, wherein the dye contains a fiber-reactive group of the formula —SO₂—Z, wherein Z is β-sulfatoethylsulfonyl, β-chloroethylsulfonyl, β-thiosulfatoethylsulfonyl, β-acetyloxyethylsulfonyl or vinyl sulfonyl, and, bonded elsewhere in the dye molecule, a second fiber-reactive group of the formula

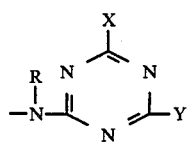

in which X is chlorine or fluorine, R is hydrogen or alkyl of 1 to 4 carbon atoms, Y is a group of the formula —O—$R^1$ or —$NR^2R^3$ in which $R^1$ is alkyl of 1 to 4 carbon atoms, $R^2$ is hydrogen or alkyl of 1 to 4 carbon atoms unsubstituted or substituted by hydroxy, sulfato, sulfo, carboxy or cyano, and $R^3$ is hydrogen or alkyl unsubstituted or substituted by hydroxy, sulfato, sulfo, carboxy, cyano, phenyl or sulfophenyl, or is phenyl unsubstituted or substituted by 1 or 2 substituents selected from the group consisting of sulfo, carboxy, chlorine, methyl, ethyl, methoxy and ethoxy.

15. The process according to claim 1, wherein the lithium dye salt prepared is the azo compound of the formula

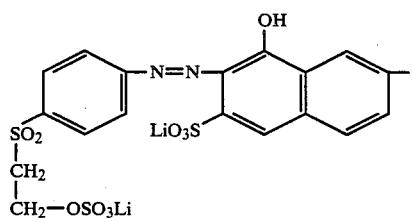

16. The process according to claim 9, wherein the lithium dye salt prepared is the azo compound of the formula

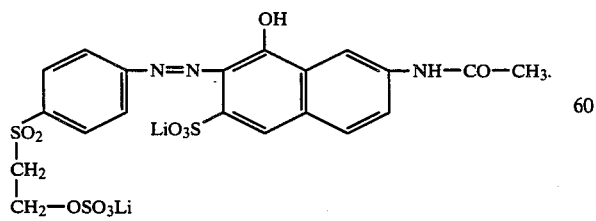

17. The process according to claim 10, wherein the lithium dye salt prepared is the azo compound of the formula

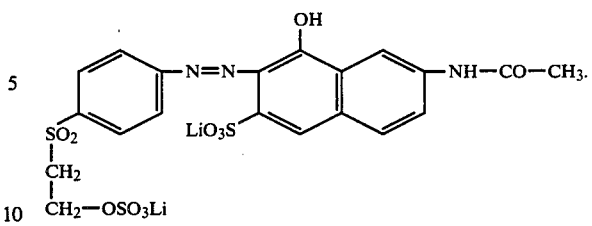

18. A process for preparing a lithium salt of a dyestuff of the formula

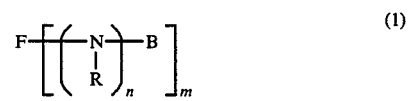

(1)

wherein
R is hydrogen or alkyl of 1 to 4 carbon atoms,
n is a number from zero to one,
m is a number from one to two,
B is a group of the formula

(2a)

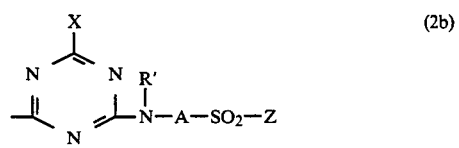
(2b)

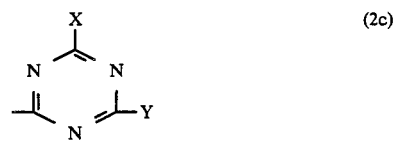
(2c)

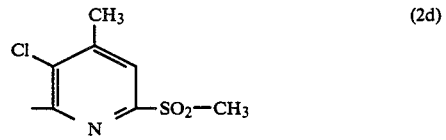
(2d)

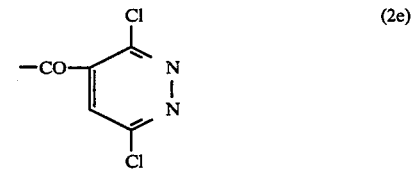
(2e)

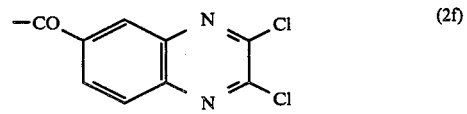
(2f)

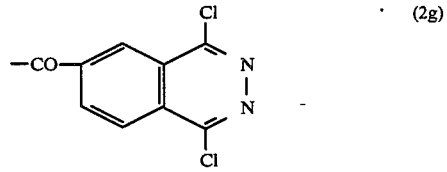
(2g)

-continued

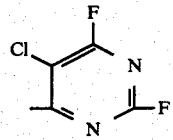 (2h)

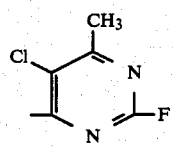 (2j)

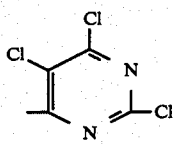 (2k)

in which
Z is β-sulfatoethylsulfonyl, β-chloroethylsulfonyl, β-thiosulfatoethylsulfonyl, β-acetyloxyethylsulfonyl or vinylsulfonyl;
X denotes chlorine or fluorine,
R' is hydrogen or alkyl of 1 to 4 carbon atoms or a group of the formula -alkylene-SO$_2$-Z, in which "alkylene" denotes alkylene of 1 to 6 carbon atoms, and
Z has one of the abovementioned meanings;
A denotes alkylene of 1 to 6 carbon atoms, or is phenylene which is unsubstituted or is substituted by 1 or 2 substituents from the group consisting of sulfo, carboxy, chlorine, methyl, ethyl, methoxy and ethoxy; or is naphthylene which is unsubstituted or is substituted by 1 or 2 sulfo groups; and
Y denotes alkoxy of the formula —O—R$^1$ or amino of the formula —NR$^2$R$^3$ in which
R$^1$ is alkyl of 1 to 4 carbon atoms;
R$^2$ is hydrogen or alkyl of 1 to 4 carbon atoms which is unsubstituted or is substituted by hydroxy, sulfato, sulfo, carboxy or cyano and
R$^3$ is hydrogen or alkyl of 1 to 4 carbon atoms, which is unsubstituted or is substituted by hydroxy, sulfato, sulfo, carboxy, cyano, phenyl or sulfophenyl, or R$^3$ is phenyl which is unsubstituted or is substituted by 1 or 2 substituents from the group consisting of sulfo, carboxy, chlorine, methyl, ethyl, methoxy and ethoxy; and
F is the radical of a water-soluble dye having 1 to 8 sulfo groups, said process comprising the steps of:
reacting the sodium or potassium or ammonium salt of said dyestuff of the formula (1), which is in aqueous suspension or aqueous solution, with a compound whih releases calcium ion, to form the water-insoluble or sparingly water-soluble calcium salts of that dyestuff,
separating the resulting calcium salt of the dyestuff from the aqueous suspension or aqueous solution, and
reacting the calcium salt in aqueous suspension with the equivalent amount of lithium sulfate or lithium hydrogen sulfate or a mixture thereof, or in an excess over the equivalent amount up to 10% to convert it into the lithium salt.

* * * * *